(12) United States Patent
Kawai et al.

(10) Patent No.: US 9,195,338 B2
(45) Date of Patent: Nov. 24, 2015

(54) TOUCH PANEL CONTROL DEVICE AND NON-TRANSITORY COMPUTER-READABLE MEDIUM

(71) Applicant: BROTHER KOGYO KABUSHIKI KAISHA, Nagoya-shi, Aichi-ken (JP)

(72) Inventors: Junya Kawai, Nagoya (JP); Yoshihiko Sugimura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 193 days.

(21) Appl. No.: 13/788,305

(22) Filed: Mar. 7, 2013

(65) Prior Publication Data

US 2013/0257764 A1 Oct. 3, 2013

(30) Foreign Application Priority Data

Mar. 29, 2012 (JP) ................. 2012-077283

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01); *G06F 2203/04808* (2013.01)

(58) Field of Classification Search
USPC ............................................... 345/173–179
See application file for complete search history.

(56) References Cited

U.S. PATENT DOCUMENTS

2006/0017709 A1* 1/2006 Okano ................. 345/173
2012/0007612 A1* 1/2012 Yeh et al. ............. 324/649

FOREIGN PATENT DOCUMENTS

| JP | 07306752 A | * 11/1995 |
| JP | H7-306752 | 11/1995 |
| JP | 2010-244132 | 10/2010 |
| JP | 2010244132 A | * 10/2010 |

OTHER PUBLICATIONS

U.S. Office Action issued in U.S. Appl. No. 13/788,272 on Dec. 16, 2014.

* cited by examiner

*Primary Examiner* — Amare Mengistu
*Assistant Examiner* — Jennifer Zubajlo
(74) *Attorney, Agent, or Firm* — McCarter & English, LLP

(57) ABSTRACT

A touch panel control device includes a first identification portion that periodically identifies a plurality of pressed cells, a second identification portion that identifies at least one separation distance based on positions of a plurality of first pressed cells that are identified by the first identification portion at a first timing, a first invalidation portion that invalidates at least one pair of first cells among the plurality of first pressed cells identified at the first timing, a second invalidation portion that invalidates second cell among a plurality of second pressed cells identified by the first identification portion at a second timing, and a decision portion that decides, as a specified position, a position of at least one pressed cell from among a plurality of pressed cells included in at least one first valid pressed cell and at least one second valid pressed cell.

6 Claims, 16 Drawing Sheets

FIG. 7

| | (3, 4) | (8, 12) | (9, 12) | (10, 12) | (8, 13) | (9, 13) | (10, 13) | (8, 14) | (9, 14) | (10, 14) | (8, 15) | (9, 15) | (10, 12) | (9, 18) | (10, 18) | (9, 19) | (10, 19) | (6, 17) | FLAG |
|---|---|---|---|---|---|---|---|---|---|---|---|---|---|---|---|---|---|---|---|
| (3, 4) | | 13 | 14 | 15 | 14 | 15 | 16 | 15 | 16 | 17 | 16 | 17 | 18 | 20 | 21 | 21 | 22 | 16 | |
| (8, 12) | 13 | | 1 | 2 | 1 | 2 | 3 | 2 | 3 | 4 | 3 | 4 | 5 | 7 | 8 | 8 | 9 | 7 | |
| (9, 12) | 14 | 1 | | 1 | 2 | 1 | 2 | 3 | 2 | 3 | 4 | 3 | 4 | 6 | 7 | 7 | 8 | 8 | |
| (10, 12) | 15 | 2 | 1 | | 3 | 2 | 1 | 4 | 3 | 2 | 5 | 4 | 3 | 7 | 6 | 8 | 7 | 9 | |
| (8, 13) | 14 | 1 | 2 | 3 | | 1 | 2 | 1 | 2 | 3 | 2 | 3 | 4 | 6 | 7 | 7 | 8 | 6 | |
| (9, 13) | 15 | 2 | 1 | 2 | 1 | | 1 | 2 | 1 | 2 | 3 | 2 | 3 | 5 | 6 | 6 | 7 | 7 | |
| (10, 13) | 16 | 3 | 2 | 1 | 2 | 1 | | 3 | 2 | 1 | 4 | 3 | 2 | 6 | 5 | 7 | 6 | 8 | |
| (8, 14) | 15 | 2 | 3 | 4 | 1 | 2 | 3 | | 1 | 2 | 1 | 2 | 3 | 5 | 6 | 6 | 7 | 5 | |
| (9, 14) | 14 | 3 | 2 | 3 | 2 | 1 | 2 | 1 | | 1 | 2 | 1 | 2 | 4 | 5 | 5 | 6 | 6 | |
| (10, 14) | 17 | 4 | 3 | 2 | 3 | 2 | 1 | 2 | 1 | | 3 | 2 | 1 | 5 | 4 | 6 | 5 | 7 | |
| (8, 15) | 16 | 3 | 4 | 5 | 2 | 3 | 4 | 1 | 2 | 3 | | 1 | 2 | 4 | 5 | 5 | 6 | 4 | |
| (9, 15) | 17 | 4 | 3 | 4 | 3 | 2 | 3 | 2 | 1 | 2 | 1 | | 1 | 3 | 4 | 4 | 5 | 5 | |
| (10, 12) | 18 | 5 | 4 | 3 | 4 | 3 | 2 | 3 | 2 | 1 | 2 | 1 | | 4 | 3 | 5 | 4 | 6 | |
| (9, 18) | 20 | 7 | 6 | 7 | 6 | 5 | 6 | 5 | 4 | 5 | 4 | 3 | 4 | | 1 | 1 | 2 | 4 | |
| (10, 18) | 21 | 8 | 7 | 6 | 7 | 6 | 5 | 6 | 5 | 4 | 5 | 4 | 3 | 1 | | 2 | 1 | 5 | |
| (9, 19) | 21 | 8 | 7 | 8 | 7 | 6 | 7 | 6 | 5 | 6 | 5 | 4 | 5 | 1 | 2 | | 1 | 5 | |
| (10, 19) | 22 | 9 | 8 | 7 | 8 | 7 | 6 | 7 | 6 | 5 | 6 | 5 | 4 | 2 | 1 | 1 | | 6 | |
| (6, 17) | 16 | 7 | 8 | 9 | 6 | 7 | 8 | 5 | 6 | 7 | 4 | 5 | 6 | 4 | 5 | 5 | 6 | | |

|  | (3, 4) | (8, 12) | (9, 12) | (10, 12) | (8, 13) | (9, 13) | (10, 13) | (8, 14) | (9, 14) | (10, 14) | (8, 15) | (9, 15) | (10, 12) | (9, 18) | (10, 18) | (9, 19) | (10, 19) | (6, 17) | FLAG |
|---|---|---|---|---|---|---|---|---|---|---|---|---|---|---|---|---|---|---|---|
| (3, 4) |  | 13 | 14 | 15 | 14 | 15 | 16 | 15 | 16 | 17 | 16 | 17 | 18 | 20 | 21 | 21 | 22 | 16 |  |
| (8, 12) | 13 |  | 1 | 2 | 1 | 2 | 3 | 2 | 3 | 4 | 3 | 4 | 5 | 7 | 8 | 8 | 9 | 7 | × |
| (9, 12) | 14 | 1 |  | 1 | 2 | 1 | 2 | 3 | 2 | 3 | 4 | 3 | 4 | 6 | 7 | 7 | 8 | 8 | × |
| (10, 12) | 15 | 2 | 1 |  | 3 | 2 | 1 | 4 | 3 | 2 | 5 | 4 | 3 | 7 | 6 | 8 | 7 | 9 | × |
| (8, 13) | 14 | 1 | 2 | 3 |  | 1 | 2 | 1 | 2 | 3 | 2 | 3 | 4 | 6 | 7 | 7 | 8 | 6 | × |
| (9, 13) | 15 | 2 | 1 | 2 | 1 |  | 1 | 2 | 1 | 2 | 3 | 2 | 3 | 5 | 6 | 6 | 7 | 7 | × |
| (10, 13) | 16 | 3 | 2 | 1 | 2 | 1 |  | 3 | 2 | 1 | 4 | 3 | 2 | 6 | 5 | 7 | 6 | 8 | × |
| (8, 14) | 15 | 2 | 3 | 4 | 1 | 2 | 3 |  | 1 | 2 | 1 | 2 | 3 | 5 | 6 | 6 | 7 | 5 | × |
| (9, 14) | 14 | 3 | 2 | 3 | 2 | 1 | 2 | 1 |  | 1 | 2 | 1 | 2 | 4 | 5 | 5 | 6 | 6 | × |
| (10, 14) | 17 | 4 | 3 | 2 | 3 | 2 | 1 | 2 | 1 |  | 3 | 2 | 1 | 5 | 4 | 6 | 5 | 7 | × |
| (8, 15) | 16 | 3 | 4 | 5 | 2 | 3 | 4 | 1 | 2 | 3 |  | 1 | 2 | 4 | 5 | 5 | 6 | 4 | × |
| (9, 15) | 17 | 4 | 3 | 4 | 3 | 2 | 3 | 2 | 1 | 2 | 1 |  | 1 | 3 | 4 | 4 | 5 | 5 | × |
| (10, 12) | 18 | 5 | 4 | 3 | 4 | 3 | 2 | 3 | 2 | 1 | 2 | 1 |  | 4 | 3 | 5 | 4 | 6 | × |
| (9, 18) | 20 | 7 | 6 | 7 | 6 | 5 | 6 | 5 | 4 | 5 | 4 | 3 | 4 |  | 1 | 1 | 2 | 4 | × |
| (10, 18) | 21 | 8 | 7 | 6 | 7 | 6 | 5 | 6 | 5 | 4 | 5 | 4 | 3 | 1 |  | 2 | 1 | 5 | × |
| (9, 19) | 21 | 8 | 7 | 8 | 7 | 6 | 7 | 6 | 5 | 6 | 5 | 4 | 5 | 1 | 2 |  | 1 | 5 | × |
| (10, 19) | 22 | 9 | 8 | 7 | 8 | 7 | 6 | 7 | 6 | 5 | 6 | 5 | 4 | 2 | 1 | 1 |  | 6 | × |
| (6, 17) | 16 | 7 | 8 | 9 | 6 | 7 | 8 | 5 | 6 | 7 | 4 | 5 | 6 | 4 | 5 | 5 | 6 |  |  |

241

TOUCH PANEL CONTROL DEVICE AND NON-TRANSITORY COMPUTER-READABLE MEDIUM

CROSS-REFERENCE TO RELATED APPLICATION

This application claims priority to Japanese Patent Application No. 2012-077283, filed Mar. 29, 2012, the content of which is hereby incorporated herein by reference in its entirety.

BACKGROUND

The present disclosure relates to a touch panel control device and a non-transitory computer-readable medium that control a touch panel on which writing is performed by touching a stylus or the like to a panel surface.

A touch panel is known on which writing is performed by a user touching a stylus to a panel surface. When the user performs writing using the stylus, there are cases in which an object other than the stylus touches the panel surface and the panel surface is thereby pressed. The object other than the stylus is, for example, a part of a hand (for example, a palm of the hand or a joint of a finger) holding the stylus, an arm, a wrist watch, clothes or the like. In this type of case, in order to identify information written using the stylus, it is necessary to distinguish a region of the panel surface pressed by the stylus from a region of the panel surface pressed by an object other than the stylus.

A touch panel is known that distinguishes a region touched by a finger tip from a region touched by the palm of a hand, in accordance with the area of the touched region. In this touch panel, it is determined that a touched region with a minimum area is touched by a finger tip. On the other hand, it is determined that a touched region with a relatively large area is touched by the palm of the hand.

When the region of the panel surface pressed by an object other than the stylus is larger than the region pressed by the stylus, this touch panel can distinguish the region pressed by the stylus from the region pressed by the object other than the stylus.

SUMMARY

However, the region pressed by the object other than the stylus is not necessarily larger than the region pressed by the stylus. For example, even when the panel surface is pressed by the object larger than the stylus, in an initial stage of a process in which the object gradually presses the panel surface, only a part of the object presses the panel surface. In this case, the area of the pressed region of the panel surface is relatively small. Therefore, there is a possibility that the region pressed by the stylus cannot be clearly distinguished from the region pressed by the object other than the stylus.

Embodiments of the broad principles derived herein provide a touch panel control device and a non-transitory computer-readable medium that can clearly distinguish and recognize a region of a panel surface specified by a stylus or the like in contrast to a region of the panel surface pressed by an object other than the stylus or the like.

Embodiments provide a touch panel control device includes a first identification portion, a second identification portion, a first invalidation portion, a second invalidation portion, and a decision portion. The first identification portion periodically identifies a plurality of pressed cells. The plurality of pressed cells is cells to which a pressing force is applied, among a plurality of cells arranged in a matrix manner on a panel surface of a touch panel. The second identification portion identifies at least one separation distance based on positions of a plurality of first pressed cells that are identified by the first identification portion at a first timing. The at least one separation distance indicates a distance between a plurality of pressed cells included in the plurality of first pressed cells. The first invalidation portion invalidates at least one pair of first cells among the plurality of first pressed cells identified at the first timing. The at least one pair of first cells is at least one pair of first pressed cells for which the separation distance identified by the second identification portion satisfies a predetermined condition. The second invalidation portion invalidates second cell among a plurality of second pressed cells identified by the first identification portion at a second timing. The second timing is a timing preceding the first timing. The second cell is a cell in the same position as a one of the at least one pair of first cells. The decision portion decides, as a specified position, a position of at least one pressed cell from among a plurality of pressed cells included in at least one first valid pressed cell and at least one second valid pressed cell. The at least one first valid pressed cell is at least one pressed cell except the at least one pair of first cells invalidated by the first invalidation portion, among the plurality of first pressed cells identified at the first timing. The at least one second valid pressed cell is at least one pressed cell except the second cell invalidated by the second invalidation portion, among the plurality of second pressed cells identified at the second timing.

Embodiments also provide a touch panel control device includes a first identification portion, a second identification portion, a first invalidation portion, a second invalidation portion, and a decision portion. The first identification portion periodically identifies a plurality of pressed cells. The plurality of pressed cells is cells to which a pressing force is applied, among a plurality of cells arranged in a matrix manner on a panel surface of a touch panel. The second identification portion, based on positions of a plurality of first pressed cells that are identified by the first identification portion at a first timing, identifies the number of adjacent cells of each of the plurality of first pressed cells. The adjacent cells are arranged adjacent to one pressed cell included in the plurality of first pressed cells, and are other first pressed cells included in the plurality of first pressed cells. The first invalidation portion invalidates, among the plurality of first pressed cells, first cells that are arranged in surrounding cells. The surrounding cells are cells that surround the first pressed cells for which the number of the adjacent cells identified by the second identification portion satisfies a predetermined condition, among the plurality of first pressed cells identified by the first identification portion at the first timing. The second invalidation portion invalidates second cell among a plurality of second pressed cells identified at a second timing. The second timing is a timing preceding the first timing. The second cell is a cell in the same positions as one of the first cells. The decision portion decides, as a specified position that is a position on the panel surface, a position of at least one pressed cell from among at least one first valid pressed cell and at least one second valid pressed cell. The at least one first valid pressed cell is at least one pressed cell except the first cells invalidated by the first invalidation portion, among the plurality of first pressed cells identified at the first timing. The at least one second valid pressed cell is at least one pressed cell except the second cell invalidated by the second invalidation portion, among the plurality of second pressed cells identified at the second timing.

Embodiments further provide a non-transitory computer-readable medium storing computer-readable instructions that instruct a touch panel control device to perform the steps of periodically identifying a plurality of pressed cells, the plurality of pressed cells being cells to which a pressing force is applied, among a plurality of cells arranged in a matrix manner on a panel surface of a touch panel, identifying at least one separation distance based on positions of a plurality of first pressed cells identified at a first timing, the at least one separation distance indicating a distance between a plurality of pressed cells included in the plurality of first pressed cells, invalidating at least one pair of first cells among the plurality of first pressed cells identified at the first timing, the at least one pair of first cells being at least one pair of first pressed cells for which the identified separation distance satisfies a predetermined condition, invalidating second cell among a plurality of second pressed cells identified at a second timing, the second timing being a timing preceding the first timing, and the second cell being a cell in the same positions as one of the at least one pair of first cells, and deciding, as a specified position, a position of at least one pressed cell from among a plurality of pressed cells included in at least one first valid pressed cell and at least one second valid pressed cell, the at least one first valid pressed cell being at least one pressed cell except the invalidated at least one pair of first cells, among the plurality of first pressed cells identified at the first timing, and the at least one second valid pressed cell being at least one pressed cell except the invalidated second cell, among the plurality of second pressed cells identified at the second timing.

BRIEF DESCRIPTION OF THE DRAWINGS

Embodiments will be described below in detail with reference to the accompanying drawings in which:

FIG. 7 is a diagram showing a first table;

FIG. 8 is a diagram showing the first table;

DETAILED DESCRIPTION

Figure 1:
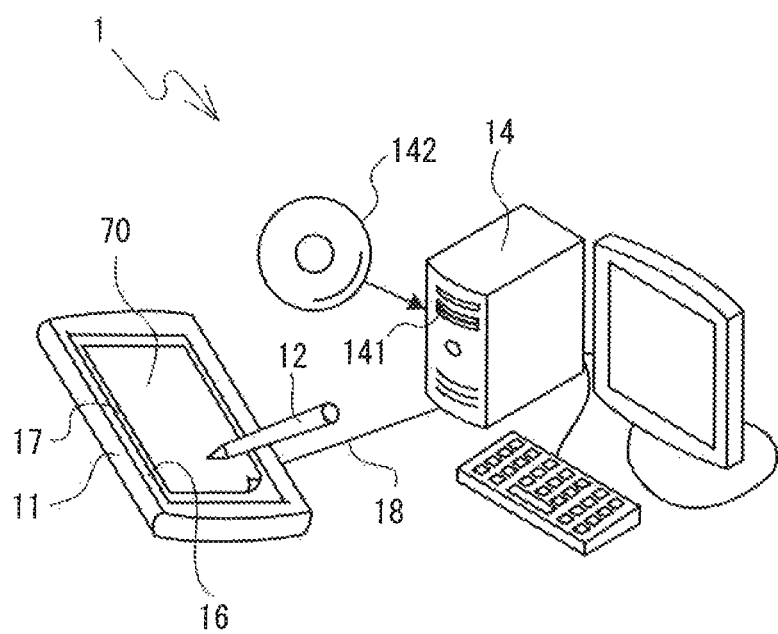
FIG. 1 is a diagram showing a hand writing input system.

Hereinafter, an embodiment of the present disclosure will be explained with reference to the drawings. A hand writing input system 1 will be explained with reference to FIG. 1. The hand writing input system 1 is a system to identify and computerize handwriting in a case where writing is performed using a general purpose writing tool 12, and to save the computerized handwriting as handwriting data. The handwriting input system 1 includes an electronic writing device 11 and a personal computer (PC) 14. The electronic writing device 11 and the PC 14 are connected via a communication cable 18.

The electronic writing device 11 includes a recessed placement portion 16 on a top surface thereof. A touch panel 17 having a substantially rectangular shape is provided on a bottom surface of the placement portion 16. A resistive film method may be used to drive the touch panel 17. In a case where the touch panel 17 is pressed by the tip end of the writing tool 12 in accordance with a writing operation performed using the writing tool 12, a position of an applied pressing force (hereinafter referred to as a pressed position) is identified. The electronic writing device 11 can identify handwriting based on the identified pressed position.

For example, a user may place a paper medium 70 on the touch panel 17, more specifically, on a top surface (hereinafter referred to as a top surface of the touch panel 17) of the electronic writing device 11. The user may use the general purpose writing tool 12 (a ballpoint pen, a mechanical pencil or the like) to write on the paper medium 70. A line may be plotted on the paper medium 70. At the same time, a pressing force may be applied to the touch panel 17 by the writing operation performed using the writing tool 12, and handwriting is identified. The electronic writing device 11 may generate handwriting data that indicates the handwriting based on the identified handwriting. In this manner, at the same time as when the line is plotted on the paper medium 70 using the writing tool 12, the handwriting data can be generated that indicates the handwriting obtained using the writing tool 12.

The PC 14 may acquire the handwriting data generated by the electronic writing device 11 from the electronic writing device 11 via the communication cable 18. The PC 14 may store, in a database, the handwriting data acquired from the electronic writing device 11. The PC 14 can analyze the handwriting data stored in the database. Further, based on the handwriting data generated by the electronic writing device 11, the PC 14 can perform analysis processing of the handwriting or display on a display the line plotted using the writing tool 12.

An electrical configuration of the electronic writing device 11 will be explained with reference to FIG. 2. The electronic writing device 11 includes a CPU 21, a ROM 22, a RAM 23, a flash memory 24, a drive circuit 25, a communication control portion 26 and a touch panel 17. The CPU 21 may perform overall control of the electronic writing device 11. A boot program and initial data may be stored in the ROM 22. Temporary data may be stored in the RAM 23. A program of the CPU 21 and a first table 241 (refer to FIG. 7 and FIG. 8, which will be described later) may be stored in the flash memory 24. The drive circuit 25 may drive the touch panel 17. The communication control portion 26 may perform communication with the PC 14 (refer to FIG. 1) via the communication cable 18 (refer to FIG. 1). The touch panel 17 includes a panel module 19. The panel module 19 includes a conductive sheet 40, a voltage application portion 38 and a voltage detection portion 39.

The PC 14 includes a drive device 141. The drive device 141 can read information stored in a storage medium 142. For example, the PC 14 reads the program of the CPU 21 stored in the storage medium 142, and transmits the program to the electronic writing device 11 via the communication cable 18. The CPU 21 may receive the program transmitted from the PC 14 and store the program in the flash memory 24. The CPU 21 can operate based on the program stored in the flash memory 24.

Figure 3:
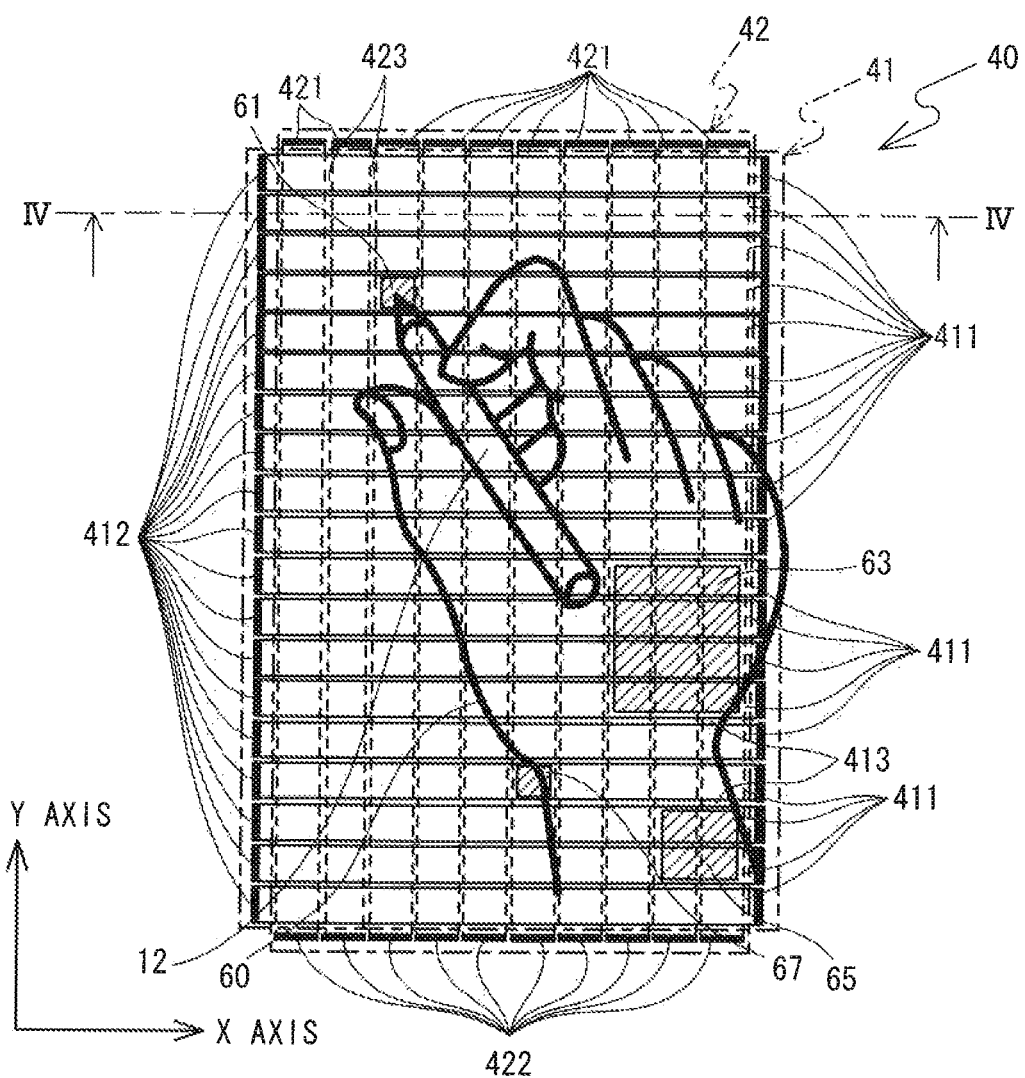
FIG. 3 is a diagram showing a conductive sheet.

A configuration of the conductive sheet 40 will be explained with reference to FIG. 3. The conductive sheet 40 includes a first conductive film 41 and a second conductive film 42. The first conductive film 41 and the second conductive film 42 each have a substantially rectangular shape. The shape of the first conductive film 41 and the second conductive film 42 is substantially the same as the shape of the touch panel 17 (refer to FIG. 1). The first conductive film 41 and the second conductive film 42 are laminated. The first conductive film 41 is disposed on the top surface of the touch panel 17 with respect to the second conductive film 42. A plurality of spacers 45 (refer to FIG. 4) are provided between the first conductive film 41 and the second conductive film 42. The spacers 45 separate the first conductive film 41 from the second conductive film 42.

The first conductive film 41 includes a plurality of transparent resistive films 411. Each of the resistive films 411 has a substantially rectangular shape. A length in the longitudinal direction of each of the resistive films 411 is the same as a length in the lateral direction of the first conductive film 41. A length in the lateral direction of each of the resistive films 411 is shorter than a length in the longitudinal direction of the first conductive film 41 and sufficiently larger than a diameter of the tip end of the writing tool 12 (refer to FIG. 1). The resistive films 411 are arranged parallel to each other in the longitudinal direction of the first conductive film 41. Gaps 413 are provided in boundary portions between the resistive films 411 that are adjacent to each other. Each of the gaps 413 is significantly shorter than the length in the lateral direction of the resistive films 411. Hereinafter, a direction (an up-down direction in FIG. 3) in which the resistive films 411 are arranged is referred to as a Y-axis direction. A direction (a left-right direction in FIG. 3) that is orthogonal to the Y-axis direction is referred to as an X-axis direction. The Y-axis direction corresponds to the longitudinal direction of the first conductive film 41 and to the lateral direction of the resistive films 411. The X-axis direction corresponds to the lateral direction of the first conductive film 41 and to the longitudinal direction of the resistive films 411. Electrodes 412 are provided at both ends, in the X axis direction, of each of the resistive films 411. The voltage application portion 38 and the voltage detection portion 39 (refer to FIG. 2) are connected to the electrodes 412. The voltage application portion 38 applies voltage to the resistive films 411 via the electrodes 412. The voltage detection portion 39 detects voltage between the electrodes 412.

The second conductive film 42 includes a plurality of transparent resistive films 421. The resistive films 421 have a substantially rectangular shape. A length in the longitudinal direction of the resistive films 421 is the same as a length in the longitudinal direction of the second conductive film 42. A length in the lateral direction of the resistive films 421 is shorter than a length in the lateral direction of the second conductive film 42 and sufficiently larger than the diameter of the tip end of the writing tool 12. The Y-axis direction corresponds to the longitudinal direction of the second conductive film 42 and the resistive films 421. The X-axis direction corresponds to the lateral direction of the second conductive film 42 and the resistive films 421. The resistive films 421 are arranged in the lateral direction of the second conductive film 42, namely, in the X-axis direction. Gaps 423 are provided in boundary portions between the resistive films 421 that are adjacent to each other. A distance between the gaps 423 is significantly shorter than the length in the lateral direction of the resistive films 421. Electrodes 422 are provided at both ends, in the Y axis direction, of each of the resistive films 421. The voltage application portion 38 and the voltage detection portion 39 (refer to FIG. 2) are connected to the electrodes 422. The voltage application portion 38 applies voltage to the resistive films 421 via the electrodes 422. The voltage detection portion 39 detects voltage between the electrodes 422.

Figure 4:
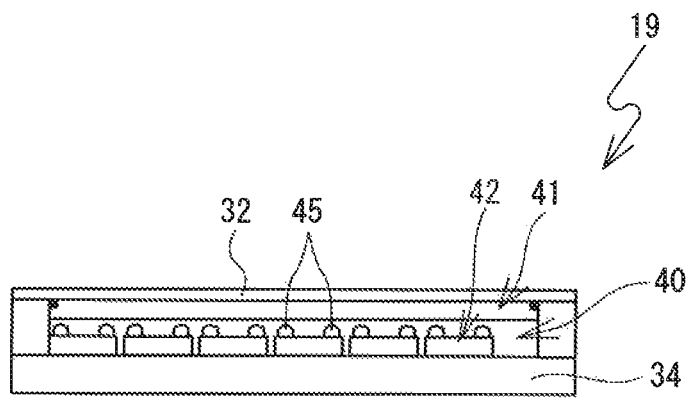
FIG. 4 is a cross-sectional view of a panel module taken along a line IV-IV shown in FIG. 3, when viewed in an arrow direction.

As shown in FIG. 4, a film 32 is laminated on a surface of the first conductive film 41 of the conductive sheet 40, the surface being opposite to another surface of the first conductive film 41 that is close to the second conductive film 42. That is, the film 32 is laminated on the top surface of the touch panel 17 (refer to FIG. 1). The film 32 may protect the conductive sheet 40. The plurality of spacers 45 are provided between the first conductive film 41 and the second conductive film 42. The spacers 45 separate the first conductive film 41 from the second conductive film 42. A glass substrate 34 is laminated on a surface of the second conductive film 42, the surface being opposite to another surface of the second conductive film 42 that is close to the first conductive film 41. The glass substrate 34 supports the conductive sheet 40. The film 32, the conductive sheet 40 and the glass substrate 34 in a laminated state, the voltage application portion 38 and the voltage detection portion 39 (refer to FIG. 2) correspond to the panel module 19. The panel module 19 is mounted on the top surface of the touch panel 17.

Figure 5:
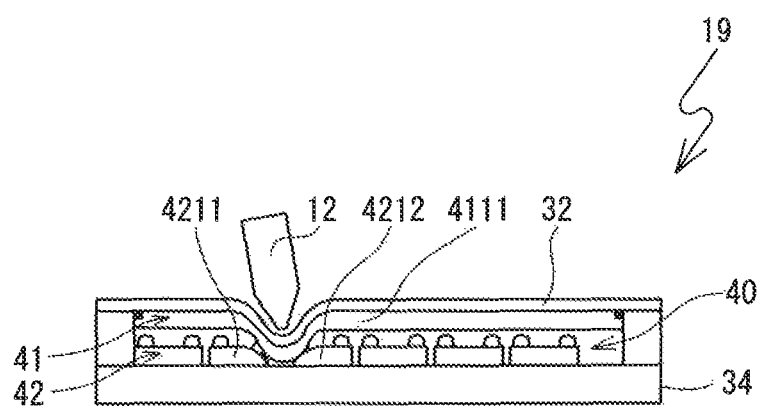
FIG. 5 is a diagram showing a state in which a pressing force is applied to the panel module.

A state when a pressing force is applied to the panel module 19 will be explained with reference to FIG. 5. Hereinafter, the upper side and the lower side of FIG. 5 are respectively referred to as the upper side and the lower side of the panel module 19. For example, in a case where the user places the paper medium 70 (refer to FIG. 1) on the bottom surface of the placement portion 16 (refer to FIG. 1) and performs writing on the paper medium 70 using the writing tool 12, a pressing force may be applied from the tip end of the writing tool 12 to the panel module 19 on the top surface of the touch panel 17 (refer to FIG. 1) that is provided on the bottom surface of the placement portion 16. As shown in FIG. 5, the panel module 19 may deform due to the pressing force applied by the writing tool 12. More specifically, the deformation may occur in the following manner. A downward pressing force may be applied to the conductive sheet 40 from the film 32 side. The film 32 and the first conductive film 41 may be deflected downward. A resistive film 4111 of the first conductive film 41 may come into contact with resistive films 4211 and 4212 of the second conductive film 42.

A method for detecting a position at which a pressing force is applied will be explained. The voltage application portion 38 (refer to FIG. 2) may apply a voltage between the electrodes 412 (refer to FIG. 3) that are provided on each of the resistive films 411 (refer to FIG. 3) included in the first conductive film 41, and between the electrodes 422 (refer to FIG. 3) that are provided on each of the resistive films 421 included in the second conductive film 42. In a state in which the voltage is applied between the electrodes, the writing operation may be performed on the touch panel 17 using the writing tool 12. The panel module 19 may deform as shown in FIG. 5.

As a result of the resistive film 4111 of the first conductive film 41 coming into contact with the resistive films 4211 and 4212 of the second conductive film 42, the voltage between the electrodes 412 provided on the resistive film 4111 and the voltage between the electrodes 422 provided on the resistive films 4211 and 4212 may be changed. The voltage detection portion 39 connected to the electrodes 412 and 422 detects a voltage between the electrodes. The CPU 21 (refer to FIG. 2) may acquire the voltage detected by the voltage detection portion 39 and detect a voltage change between the electrodes 412 and between the electrodes 422. The CPU 21 may identify a region in which the resistive film 4111 provided with the electrodes 412 whose voltage has changed intersects with the resistive films 4211 and 4212 provided with the electrodes 422 whose voltage has changed, as a pressed position to which a pressing force is applied from the outside.

In this manner, the panel module 19 can identify the pressed position to which the pressing force is applied by an object, such as the writing tool 12, coming into contact with the panel module 19, for each region (hereinafter also referred to as a cell) in which the resistive films 4111 and 4211 intersect with each other. Hereinafter, the cell that is identified as the pressed position is referred to as a pressed cell. In the present embodiment, as shown in FIG. 3, the cells are formed in a matrix manner on the top surface (the panel surface) of the touch panel 17. Further, the electrodes 412 and 422 are separately provided on the resistive films 411 and 421 that form the respective cells. Therefore, the CPU 21 can identify the pressed position for each cell. Thus, even when pressing forces are simultaneously applied to a plurality of positions on the touch panel 17, the CPU 21 can simultaneously identify a plurality of pressed cells.

In a case where a pressing force is applied to a boundary portion between the resistive films 4211 and 4212 as shown in FIG. 5, the resistive film 4111 may come into contact with the resistive films 4211 and 4212. Therefore, the CPU 21 may identify, as pressed cells, both the cell in which the resistive films 4111 and 4211 intersect with each other and the cell in which the resistive films 4111 and 4212 intersect with each other. In this manner, in a case where a pressing force is applied to the boundary portion between the resistive films 4211 and 4212, or in a case where a pressing force is applied to the touch panel 17 by a relatively large object, the CPU 21 may simultaneously identify the plurality of cells arranged adjacent to each other, as the pressed cells.

Figure 2:
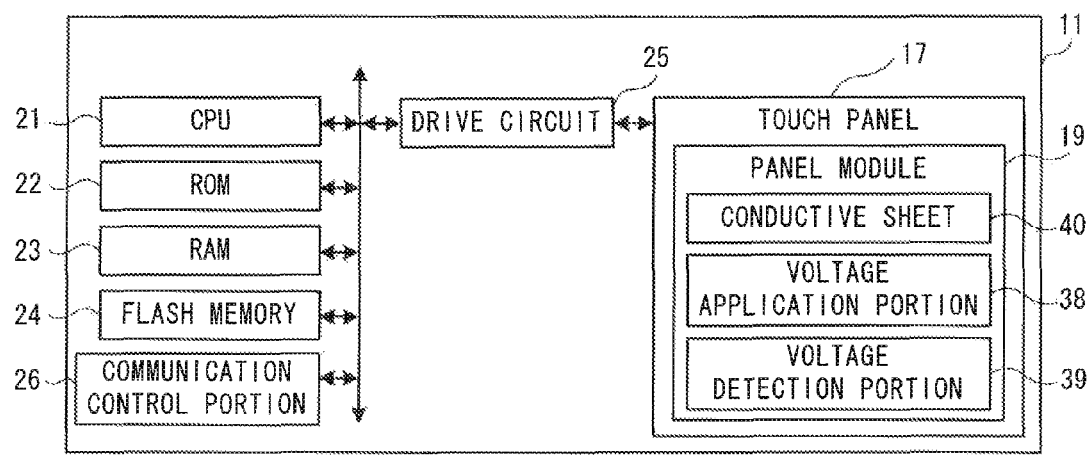
FIG. 2 is a block diagram showing an electrical configuration of an electronic writing device.

The user can perform a writing operation on the touch panel 17 (refer to FIG. 1) using the writing tool 12 (refer to FIG. 1). As shown in FIG. 3, for example, the user may perform a writing operation using the writing tool 12 while stabilizing a hand 60 by placing the palm of the hand 60 or the wrist on the touch panel 17. In a case where the writing operation is being performed, there is a case in which a wrist watch or an accessory worn around the wrist is pressed against the touch panel 17. In this type of case, the CPU 21 may identify a cell to which a pressing force is applied by the tip end of the writing tool 12, as a pressed cell 61. Further, the CPU 21 may identify cells to which pressing forces are applied by the palm of the hand 60 and by the wrist, as pressed cells 63 and 65. Further, the CPU 21 may identify a cell to which a pressing force is applied by the wrist watch or the accessory worn around the wrist, as a pressed cell 67.

Figure 6:
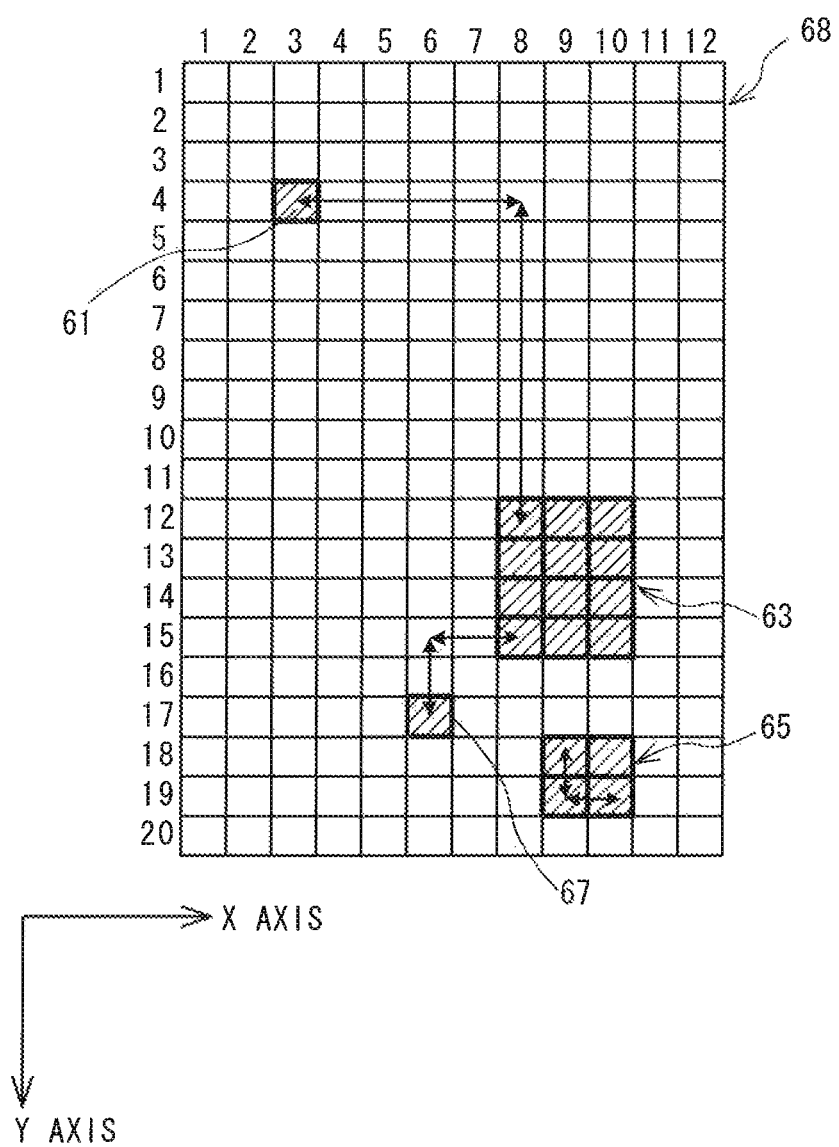
FIG. 6 is a diagram showing pressed cells.

FIG. 6 shows positions of the identified pressed cells 61 to 67 among cells 68 that are arranged in a matrix manner. In the present embodiment, the diameter of the tip end of the writing tool 12 (refer to FIG. 3) is sufficiently smaller than the side length of each cell. In a case where a single cell is pressed by the writing tool 12, the CPU 21 identifies the single pressed cell as the pressed cell 61. On the other hand, the area of the palm of the hand 60 (refer to FIG. 3) or the wrist that comes into contact with the touch panel 17 may be larger than the area of a cell. Therefore, the palm of the hand 60 or the wrist can simultaneously press a plurality of adjacent cells. In a case where the plurality of cells adjacent one another are pressed simultaneously, the CPU 21 may identify the plurality of cells that are arranged adjacent to each other, as the pressed cells 63 and 65. In a case where a region with which a small wrist watch or an accessory worn around the wrist comes into contact is smaller than a single cell, the single cell may be pressed by the wrist watch or the accessory. In this case, the CPU 21 may identify the single cell that has been pressed as the pressed cell 67.

In order to acquire handwriting data that indicates handwriting written by the writing tool 12, the CPU 21 needs to distinguish the pressed cell 61 to which a pressing force has been applied by the writing tool 12 from the other pressed cells 63 to 67 and to identify the pressed cell 61. Hereinafter, a method for distinguishing the pressed cell 61 to which the pressing force has been applied by the writing tool 12 from the other pressed cells 63, 65 and 67 and identifying the pressed cell 61 will be explained in detail. Note that numbers are sequentially assigned to the respective cells 68 shown in FIG. 6, from the upper left corner cell in the X-axis direction and in the Y-axis direction, and each of the cells 68 is denoted as, for example, the cell 68 (X, Y) using the assigned numbers. For example, the pressed cell 61 that is the third cell from the upper left corner cell in the X-axis direction and that is the fourth cell from the upper left corner cell in the Y-axis direction is denoted as the pressed cell 61 (3, 4).

After identifying the pressed cells 61 to 67, the CPU 21 may identify separation distances between the identified pressed cell 61 (3, 4), the pressed cells 63 ((8, 12), (9, 12), (10,12) . . . ), the pressed cells 65 ((9, 18), (10, 18) . . . ) and the pressed cell 67 (6, 17). The separation distance is a distance indicating a degree of separation between one pressed cell and another pressed cell, and is calculated by adding a distance (per cell) between the pressed cells in the X-axis direction and a distance (per cell) between the pressed cells in the Y-axis direction. For example, the pressed cell 61 (3, 4) is separated from the pressed cell 63 (8, 12) by 5 cells in the X-axis direction and by 8 cells in the Y-axis direction. Therefore, the separation distance between the pressed cell 61 (3, 4) and the pressed cell 63 (8, 12) is 13 (=5+8). Further, for example, the separation distance between the pressed cell 65 (9, 18) and the pressed cell 65 (10, 19) is 2 (=1+1). Further, for example, the separation distance between the pressed cell 63 (8, 15) and the pressed cell 67 (6, 17) is 4 (=2+2).

In order to identify the separation distance, the CPU 21 may select, for example, a pressed cell having a minimum Y coordinate value, from among the identified pressed cells. In a case where a plurality of pressed cells are selected, the CPU 21 may select a pressed cell having a minimum X coordinate value, from among the selected plurality of pressed cells. The CPU 21 may extract the selected pressed cell and a pressed cell other than the selected pressed cell, as a pair of pressed cells. The CPU 21 may identify a separation distance between the extracted pair of pressed cells. In this manner, the CPU 21 may extract all combinations from the identified pressed cells 61 to 67, and identify a separation distance for each of the extracted combinations. The CPU 21 associates the identified separation distance with position information that indicates a position of each pressed cell, and stores the position information and the separation distance in the first table 241 (refer to FIG. 7). The position information may be coordinate information that indicates the position (X, Y) in the X-axis direction and the Y-axis direction of each of the pressed cells 61 to 67 in a case where the upper left corner cell (1, 1) among the cells 68 arranged in a matrix manner is taken as a reference. For example, as shown in FIG. 7, the position information (the leftmost column) and the separation distances are associated and stored in the first table 241.

Next, the CPU 21 invalidates the position information that is associated with the separation distance "2", among the position information stored in the first table 241. The CPU 21 may store flag information indicating that the position information is invalid, in association with the position information of each position, and thereby invalidates the corresponding position information. In the case of the first table 241 shown in FIG. 7, all position information, except the position information (3, 4) and (6, 17), is associated with the separation distance "2". Therefore, as shown in FIG. 8, the CPU 21 may store the flag information in association with the position information except the position information (3, 4) and (6, 17). In the present embodiment, the flag information is indicated by "x" (refer to FIG. 8). In this manner, the CPU 21 may invalidate the position information associated with the separation distance "2". Hereinafter, the position information that is not associated with the flag information is referred to as valid position information.

The reason the position information including the separation distance "2" is made invalid is as follows. The diameter of the tip end of the writing tool 12 is sufficiently smaller than the side length of each cell. In a case where the writing tool 12 presses an adjacent portion of two cells having sides that are adjacent to each other, the adjacent cells may be simultaneously identified as the pressed cells. Therefore, in this case, the number of the pressed cells is two. For that reason, in a case where the touch panel 17 is pressed by the writing tool 12, in many cases, the number of the pressed cells that are simultaneously identified by the CPU 21 is one or two. Note that, in a case where the writing tool 12 presses an adjacent portion where vertices of the cells are adjacent to each other, four pressed cells may be simultaneously identified. However, the possibility that the four pressed cells are simultaneously identified is smaller than the case in which a single pressed cell is identified or two pressed cells are simultaneously identified.

On the other hand, when the touch panel 17 is pressed by an object other than the writing tool 12 in a case where a writing operation is performed using the writing tool 12, in many cases, the number of the pressed cells identified by the CPU 21 is four or more. Further, in many cases, the identified four or more pressed cells are arranged adjacent to each other.

Even when the position information of each of the four or more pressed cells that are arranged adjacent to each other is associated with the separation distance and stored in the first table 241 (refer to FIG. 7), since the processing that invalidates the position information associated with the separation distance "2" is performed, the position information of the pressed cells arranged adjacent to each other is invalidated. Therefore, the position information of the pressed cells 63 and 65 (the position information except the position information (3, 4) and (6, 17) in FIG. 8) shown in FIG. 6 is invalidated. Note that, depending on the arrangement of the adjacent four or more pressed cells, there are cases in which the position information of the pressed cells is not invalidated (refer to FIG. 10, which will be described later). This type of pressed cells are invalidated by other processing (invalidation processing, refer to FIG. 11), which will be described later. Details will be described later.

In contrast to this, even when the processing that invalidates the position information associated with the separation distance "2" is performed, the position information that is not associated with the separation distance "2" ((3, 4) and (6, 17) in FIG. 7) is not invalidated. Therefore, the position information of the pressed cell 61 ((3, 4) in FIG. 8) pressed by the writing tool 12 is not invalidated.

As described above, the CPU 21 can invalidate the pressed cells pressed by an object other than the writing tool 12, by invalidating the position information in the first table 241 that is associated with the separation distance "2". On the other hand, the pressed cell pressed by the writing tool 12 is not invalidated. Therefore, the CPU 21 can clearly distinguish and identify the pressed cell 61 to which the pressing force has been applied by the writing tool 12 in contrast to the pressed cells 63 and 65 to which the pressing force has been applied by an object other than the writing tool 12.

Next, the CPU 21 refers to the first table 241 (refer to FIG. 8) and selects a minimum separation distance for each piece of valid position information. The minimum separation distance is the smallest separation distance among the separation distances associated with the valid position information. In the case of FIG. 8, the minimum separation distance "13" is selected from among the separation distances associated with the position information (3, 4) that indicates the position of the pressed cell 61. In a similar manner, the minimum separation distance "4" is selected from among the separation distances associated with the position information (6, 17) that indicates the position of the pressed cell 67.

The CPU 21 decides the position information associated with the largest minimum separation distance among all the selected minimum separation distances, as the position information of the pressed cell pressed by the writing tool 12. In the present embodiment, the minimum separation distance "13" of the position information (3, 4) and the minimum separation distance "4" of the position information (6, 17) are selected. Therefore, in the case of FIG. 8, the position information (3, 4) associated with the minimum separation distance "13" is decided as the position information that indicates the position specified by the writing tool 12. Hereinafter, the position specified by the writing tool 12 is also referred to as the specified position. Note that, in a case where the number of pieces of valid position information stored in the first table 241 is one, the single piece of valid position information is decided as the position information that indicates the specified position.

The reason the position information associated with the largest minimum separation distance among the plurality of minimum separation distances is identified as the position information of the specified position is as follows. In many cases, the position of the pressed cell 61 pressed by the writing operation performed using the writing tool 12 is significantly separated from the position of the pressed cells 63 to 67 pressed by an object (the palm of the hand 60 (refer to FIG. 3), the wrist, a wrist watch, an accessory or the like of the user, for example) other than the writing tool 12 (refer to FIG. 3, for example). Therefore, the CPU 21 decides, as the position information of the specified position, the position information associated with the separation distance for which the minimum separation distance is the largest. By doing this, the CPU 21 can easily and clearly distinguish the specified position specified by the writing tool 12 in contrast to the position of the touch panel 17 that is unintentionally pressed by the user, and can easily recognize the specified position.

Further, the reason the minimum separation distances are selected from among the separation distances associated with the position information and compared is as follows. In many cases, the pressed cells pressed by an object other than the writing tool 12 are arranged adjacent to each other and the pressed cells are arranged in proximity to each other. For example, in FIG. 6, the pressed cells 63 to 67 pressed by an object other than the writing tool 12 are located in proximity to each other (the lower right part of the conductive sheet 40). On the other hand, the pressed cell 61 pressed by the writing tool 12 is located in a position separated from the pressed cells 63 to 67. Therefore, the CPU 21 compares the minimum separation distances and extracts the largest minimum separation distance. By doing this, the CPU 21 can exclude the pressed cells 63 to 67 from comparison targets when deciding the specified position. Thus, the CPU 21 can effectively exclude the pressed cells 63 to 67 that are detected in a case where the user unintentionally presses the touch panel 17, and can appropriately decide the specified position.

Figure 9:
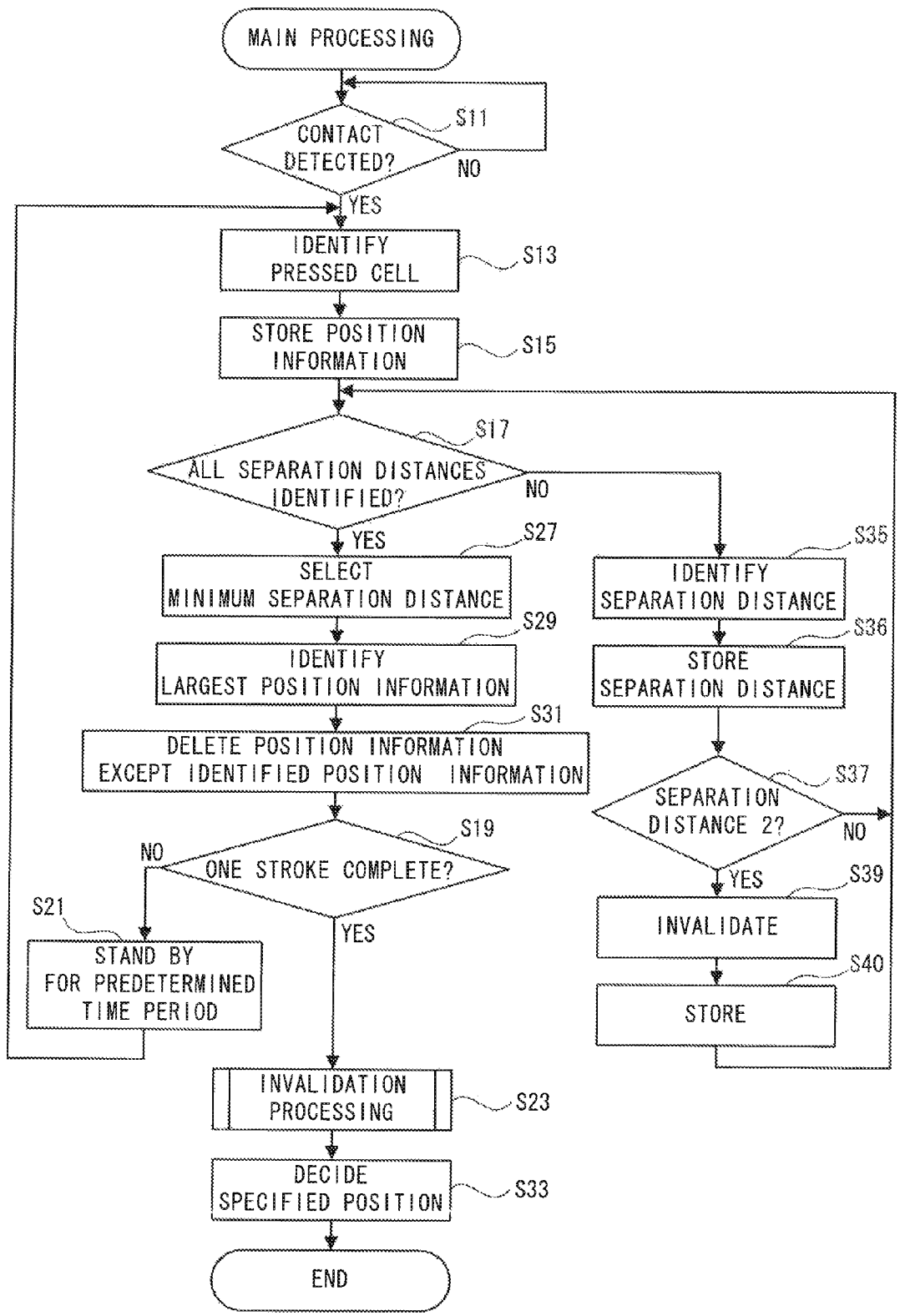
FIG. 9 is a flowchart showing main processing.

Main processing that is performed by the CPU 21 will be explained with reference to FIG. 9. In a case where a power supply of the electronic writing device 11 is turned on, the main processing is started by the CPU 21 executing the program stored in the flash memory 24. The CPU 21 may apply a voltage between the electrodes 412 (refer to FIG. 3) provided at both the ends of each of the resistive films 411 (refer to FIG. 3) of the conductive sheet 40 (refer to FIG. 3) and between the electrodes 422 (refer to FIG. 3) provided at both the ends of each of the resistive films 421 (refer to FIG. 3) of the conductive sheet 40, via the voltage application portion 38 (refer to FIG. 2). The CPU 21 may detect the voltage between the electrodes 412 and 422 via the voltage detection portion 39 (refer to FIG. 2).

Based on the voltage detected via the voltage detection portion 39, the CPU 21 determines whether contact between the resistive films 411 and 421 has been detected (step S11). In a case where the contact between the resistive films 411 and 421 has not been detected (no at step S11), the pressed cell is not identified. In order to continuously monitor the contact between the resistive films 411 and 421, the processing returns to step S11.

In a case where the contact between the resistive films 411 and 421 has been detected (yes at step S11), the CPU 21 identifies the pressed cell (step S13). The CPU 21 stores position information indicating a position of the identified pressed cell in the first table 241 (refer to FIG. 7 and FIG. 8) (step S15). The CPU 21 determines whether the separation distances between the pressed cell identified at step S13 and the other pressed cells indicated by the position information stored in the first table 241 have all been identified (step S17). In a case where there is the separation distance that has not been identified (no at step S17), the CPU 21 selects, from among combinations of the pressed cell identified at step S13 and the other pressed cells, a combination for which the separation distance has not been identified, and identifies the separation distance (step S35). The CPU 21 associates the identified separation distance with the position information of the pressed cells and stores the separation distance in the first table 241 (step S36).

The CPU 21 determines whether the separation distance identified at step S35 is 2 (step S37). In a case where the separation distance is 2 (yes at step S37), the CPU 21 associates flag information indicating that the position information is invalid with the position information of the pressed cells and stores the flag information in the first table 241. By doing this, the CPU 21 invalidates the position information associated with the separation distance "2" (step S39). The CPU 21 stores the invalidated position information in a previous cycle table (not shown in the drawings) of the flash memory 24 (step S40). The previous cycle table may be used in the invalidation processing (refer to step S23) that will be described later. The processing returns to step S17. On the other hand, in a case where the separation distance identified at step S35 is a value other than 2 (no at step S37), the processing returns to step S17. The CPU 21 selects, from among the combinations of the pressed cell identified at step S13 and the other pressed cells, a combination for which the separation distance has not been identified, and repeatedly identifies the separation distance. In a case where the separation distance is repeatedly identified and all the separation distances have been identified (yes at step S17), the processing proceeds to step S27. Note that, at this point in time, the information shown in FIG. 8 has been stored in the first table 241.

The CPU 21 refers to the first table 241 and selects the minimum separation distance from among the separation distances associated with the valid position information, for each piece of valid position information (step S27). Next, the CPU 21 identifies the position information associated with the minimum separation distance that is the largest among the selected minimum separation distances (step S29). The CPU 21 deletes, from the position information stored in the first table 241, the position information except the position information identified at step S29 (step S31). The CPU 21 stores, in the flash memory 24, the position information stored in the first table 241 as writing data. The processing proceeds to step S19.

The CPU 21 determines whether one stroke of the writing operation is complete (step S19). One stroke indicates a continuous line segment from a start to an end. In a case where no valid position information is left in the first table 241, the CPU 21 determines that one stroke of the writing operation is complete. Note that cases in which it is determined that one stroke of the writing operation is complete include: (1) a case in which no pressed cell is detected for a predetermined time period; and (2) a case in which all the position information of the detected pressed cells is invalidated at step S39. In a case where one stroke of the writing operation is not complete (no at step S19), the CPU 21 stands by for a predetermined time period in order to periodically identify the pressed cells (step S21). After the predetermined time period has elapsed, the CPU 21 returns the processing to step S13 and repeatedly identifies the pressed cells until one stroke of the writing operation is complete.

In a case where one stroke of the writing operation is complete (yes at step S19), the CPU 21 stores, in the flash memory 24, the position information stored in the first table 241 as writing data. The writing data corresponding to the one stroke of the writing operation is stored in the flash memory 24. The CPU 21 performs the invalidation processing (refer to FIG. 11) in order to invalidate the position information included in the writing data, according to need (step S23). The outline of the invalidation processing is as follows.

Figure 10:
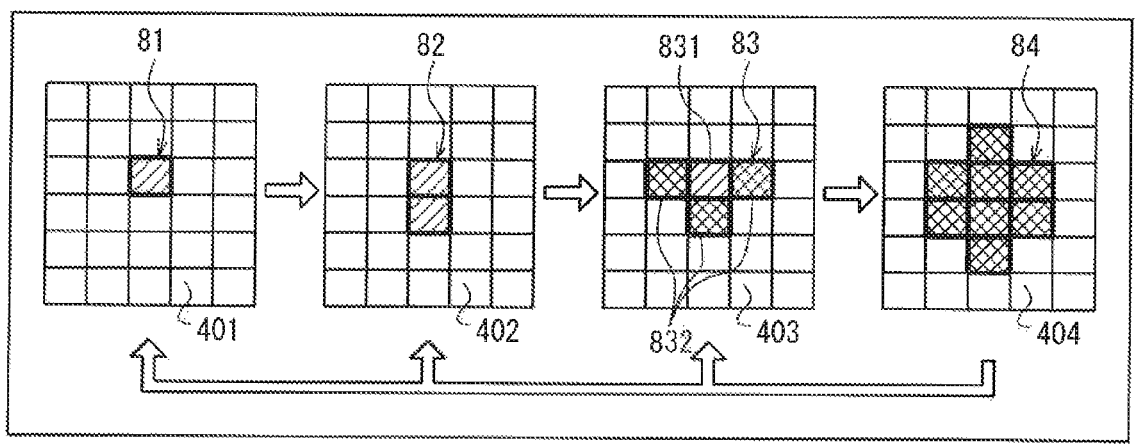
FIG. 10 is a diagram showing pressed cells.

An object other than the writing tool 12 (the palm of the hand 60 (refer to FIG. 3), the wrist or the like, for example) may gradually press the conductive sheet 40 and presses the conductive sheet 40 while increasing a contact area. FIG. 10 shows pressed cells 81 to 84 that are identified periodically (a first cycle 401 to a fourth cycle 404) by the CPU 21. As the contact area between the conductive sheet 40 and the object increases, the number of the identified pressed cells gradually increases along with the elapse of time. For example, in the first cycle 401, the object is slightly in contact with the conductive sheet 40, and thus only a part of the object presses the conductive sheet 40. As a result, the pressed cell 81 only is identified. In the second cycle 402 after the predetermined time period has elapsed from the first cycle 401, the conductive sheet 40 and the object have greater contact with each other, and thus a larger part of the object presses the conductive sheet 40. As a result, a plurality of the pressed cells 82 that are adjacent to each other are identified. The pressed cells 83 whose number is larger than that of the pressed cells 82 are identified in the third cycle 403, and the pressed cells 84 whose number is larger than that of the pressed cells 83 are identified in the fourth cycle 404.

At step S37 and step S39, the CPU 21 invalidates the position information associated with the separation distance "2" in the first table 241. By invalidating the position information, the CPU 21 distinguishes the pressed position pressed by the writing tool 12 from the pressed positions pressed by an object other than the writing tool 12. In a case where the processing at step S37 and step S39 is performed and one stroke of the writing operation is complete, all the position information of the pressed cells 84 is associated with the separation distance "2" in the fourth cycle 404. In this case, all the position information of the pressed cells 84 is invalidated. As a result, the pressed cells 84 pressed by an object other than the writing tool 12 are excluded from selection targets when deciding the pressed cells pressed by the writing tool 12.

In contrast to this, in the third cycle 403, a pressed cell 831 located at the center of the pressed cells 83 is associated with 1 as the minimum separation distance. In other words, the pressed cell 831 is not associated with the separation distance "2". On the other hand, pressed cells 832 that are adjacent to the pressed cell 831 are associated with the separation distance "2". Therefore, the position information of the pressed cells 832 is invalidated and the position information of the pressed cell 831 is not invalidated. Further, in the first cycle 401 and the second cycle 402, the pressed cells 81 and 82 are not associated with the separation distance "2". Therefore, the position information of the pressed cells 81 and 82 is not invalidated. As a result, although the pressed cells 81, 82 and 831 are pressed by an object other than the writing tool 12, they may be used as selection targets when deciding the pressed cells pressed by the writing tool 12. Therefore, there is a possibility that the pressed cells 81, 82 and 831 are erroneously identified as the pressed cells pressed by the writing tool 12.

The CPU 21 invalidates the position information of the pressed cells 81, 82 and 831 in the following manner. In a case where, at step S19 (refer to FIG. 9), the CPU 21 determines that one stroke of the writing operation is complete because of the fact that no pressed cell is detected (case (1) above) and the position information of the pressed cells 84 is stored in the previous cycle table corresponding to the writing data of one stroke, the CPU 21 invalidates, among the position information included in the writing data, the position information of the pressed cells 81, 82 and 831 that are in the same positions as the invalidated pressed cells 84. In this manner, among the pressed cells pressed by an object other than the writing tool 12, the CPU 21 can retrospectively invalidate the position information of the pressed cells that were not invalidated when identifying the pressed cells (when performing the processing at step S37 and step S39 (refer to FIG. 9)). Thus, the CPU 21 can inhibit the positions pressed by an object other than the writing tool 12 from being erroneously recognized as the positions pressed by the writing tool 12. The CPU 21 can accurately identify the pressed cell pressed by the writing tool 12.

On the other hand, in a case where all the position information of the detected pressed cells is invalidated at step S39 (case (2) above) and the CPU 21 determines that one stroke of the writing operation is complete, the writing operation is continuously performed. At the same time at which the position information is retrospectively invalidated based on the previous cycle table, it is also necessary to invalidate the position information of a later stage of the continuing writing operation. The CPU 21 invalidates the position information included in the writing data in the following manner. First, the CPU 21 invalidates the position information of the pressed cells 81, 82 and 831 that are in the same positions as the invalidated pressed cells 84, using the same method as the above-described case (1). In addition, the CPU 21 stores the information stored in the previous cycle table in a later cycle table (not shown in the drawings) of the flash memory 24. In a case where the next stroke of the writing operation is complete, the CPU 21 refers to the later cycle table. In a case where the position information of the pressed cells 84 is included in the later cycle table, the CPU 21 invalidates the position information of the pressed cells that are in the same positions as the pressed cells 84. By doing this, the CPU 21 can invalidate the position information corresponding to two writing operations that are actually a continuous stroke of the writing operation. In this manner, among the pressed cells that are pressed by an object other than the writing tool 12 presses the touch panel 17, the CPU 21 can invalidate the position information of the pressed cells that were not invalidated when identifying the pressed cells, based on the position information of the pressed cells invalidated in the past. Thus, the CPU 21 can more accurately identify the pressed cell pressed by the writing tool 12.

Figure 11:
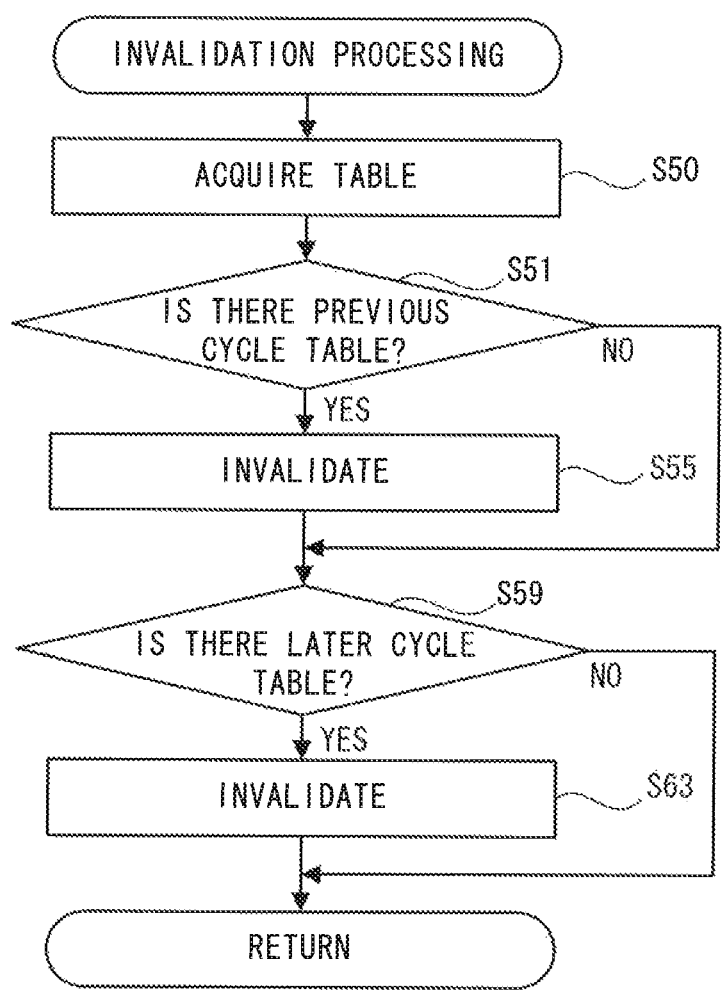
FIG. 11 is a flowchart showing invalidation processing.

The invalidation processing will be described in more detail with reference to a flowchart shown in FIG. 11. The CPU 21 acquires writing data of one stroke from the flash memory 24 (step S50). The CPU 21 determines whether it has been determined at step S19 (refer to FIG. 9) that one stroke of the writing operation is complete based on the reason of case (1), and whether the previous cycle table corresponding to the writing data of one stroke acquired at step S50 is stored in the flash memory 24 (step S51). In a case where the previous cycle table is stored in the flash memory 24 (yes at step S51), the CPU 21 invalidates, among the writing data acquired at step S50, the position information that is the same as the position information stored in the previous cycle table (step S55). The processing proceeds to step S59. On the other hand, in a case where the previous cycle table is not stored in the flash memory 24 (no at step S51), the CPU 21 advances the processing to step S59.

The CPU 21 determines whether it has been determined at step S19 (refer to FIG. 9) that one stroke of the writing operation is complete based on the reason of case (2), and whether a later cycle table corresponding to the stroke immediately preceding the stroke of the writing data acquired at step S50 is stored in the flash memory 24 (step S59). In a case where the later cycle table is stored in the flash memory 24 (yes at step S59), the CPU 21 invalidates, among the writing data acquired at step S50, the position information that is the same as the position information stored in the later cycle table (step S63). The invalidation processing ends and the processing returns to the main processing (refer to FIG. 9). On the other hand, in a case where the later cycle table is not stored in the flash memory 24 (no at step S59), the invalidation processing ends and the processing returns to the main processing (refer to FIG. 9).

After the invalidation processing (step S23) ends, the CPU 21 decides the position information included in the writing data stored in the flash memory 24 as the position information indicating the specified position on the touch panel 17 that is specified by the writing tool 12 (step S33). The main processing ends.

Figure 12:
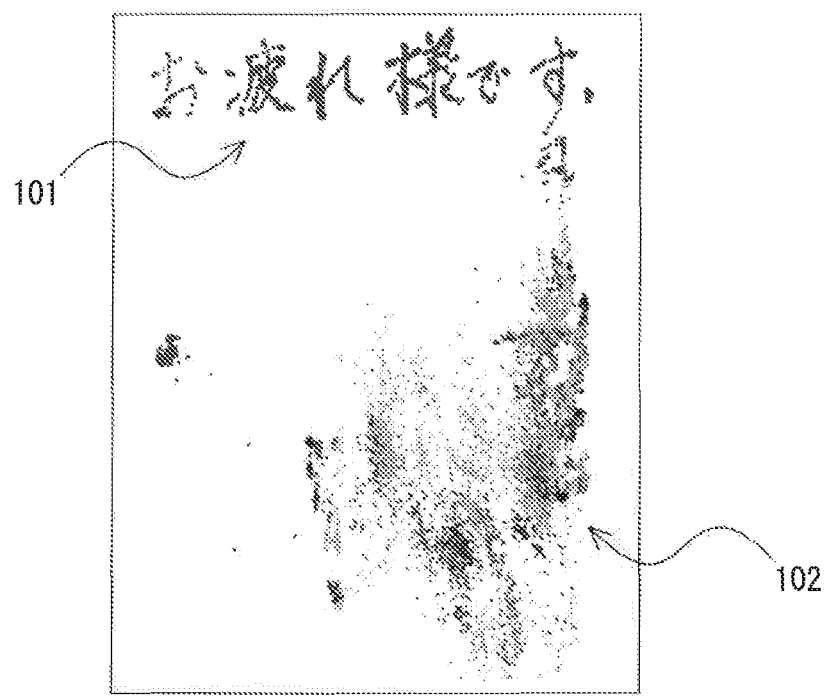
FIG. 12 is a diagram showing a plotted result based on position information of identified pressed cells.

FIG. 12 shows a result in which the pressed positions are plotted based on the position information of the identified pressed cells. In the present embodiment, characters in the character string "OTSUKARESAMADESU" are plotted by a writing operation on the upper part of the paper medium 70 (refer to FIG. 1) that is placed on the touch panel 17. As shown in FIG. 12, the characters in the character string "OTSUKARESAMADESU" are formed in pressed positions 101. Further, in a case where positions on the touch panel 17 corresponding to pressed positions 102 are pressed by the user's hand, the pressed positions 102 are dispersed on a part to the lower right of the pressed positions 101 (the character string), as shown in FIG. 12.

Figure 13:
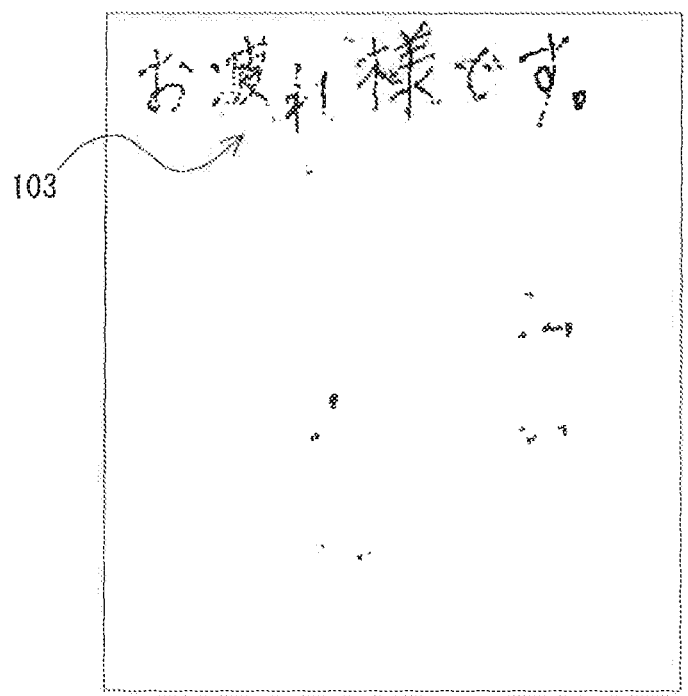
FIG. 13 is a diagram showing a plotted result based on position information of identified pressed cells.

FIG. 13 shows a result in which the specified positions decided by the CPU 21 performing the main processing (refer to FIG. 9) are plotted. In the same manner as the case of FIG. 12, the characters "OTSUKARESAMADESU" are formed in specified positions 103. On the other hand, unlike the case of FIG. 12, the pressed positions are rarely detected on the lower right side of the specified positions 103. In this manner, in a case where the above-described main processing is performed by the CPU 21, the pressed cells pressed by an object other than the writing tool 12 are invalidated. Thus, the pressed positions pressed by an object other than the writing tool 12 are effectively excluded from the writing data.

As explained above, the CPU 21 extracts the pressed cell corresponding to the largest minimum separation distance. The extracted pressed cell is identified as the specified position. The CPU 21 can easily recognize the pressed cell pressed by the writing tool 12 by clearly distinguishing from the pressed cells pressed by an object other than the writing tool 12. Further, in a case where the CPU 21 invalidates the position information of the pressed cells, the CPU 21 can also invalidate the position information acquired at another cycle. Therefore, the CPU 21 can accurately distinguish and recognize the pressed cell pressed by the writing tool 12.

The present disclosure is not limited to the above-described embodiment and various modifications are possible. In the above-described embodiment, the CPU 21 that is provided outside the touch panel 17 performs the processing to identify the pressed position. In contrast to this, the touch panel 17 may be provided with a CPU, a ROM, a RAM, a flash memory and the like. The CPU included in the touch panel 17 may perform the above-described processing performed by the CPU 21. Further, a CPU of the PC 14 may perform the above-described processing performed by the CPU 21.

In the above description, the touch panel 17 is driven by a resistive film method. However, the present disclosure is not limited to this method. The touch panel 17 may operate based on another driving method.

In the above description, the condition for invalidating the position information at step S35 and step S39 (refer to FIG. 9) is "the separation distance is 2". However, the value of the separation distance used as the condition for invalidating the position information stored in the first table 241 may be different from 2. For example, the CPU 21 may invalidate the position information stored in the first table 241 based on the separation distance is 3 or 4.

In the above description, the pressed cells to be invalidated are identified based on the separation distance between the pressed cells. However, the CPU 21 may identify the pressed cells to be invalidated using another method. Hereinafter, another method that may be used to identify the pressed cells to be invalidated will be explained.

Figure 14:
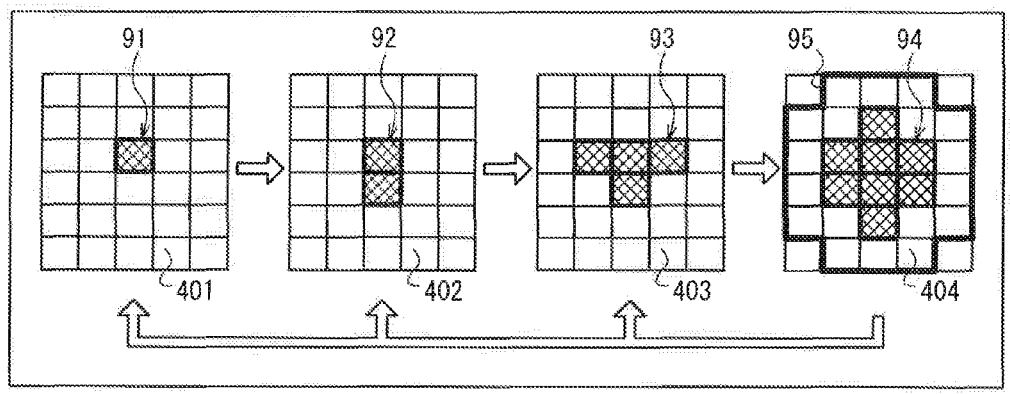
FIG. 14 is a diagram showing pressed cells according to a modified example.

FIG. 14 shows pressed cells that are identified periodically (the first cycle 401 to the fourth cycle 404) by the CPU 21 in a process in which an object other than the writing tool 12 presses the conductive sheet 40. In a case where the object presses the conductive sheet 40, the deflection of the first conductive film 41 (refer to FIG. 5) becomes larger as the pressing force increases. Therefore, a contact area between the first conductive film 41 and the second conductive film 42 (refer to FIG. 5) gradually increases. As a result, the number of the identified pressed cells (pressed cells 91 to 94) gradually increases as the pressing force increases.

In a case where the pressed cells are identified, the first conductive film 41 and the second conductive film 42 corresponding to surrounding cells do not come into contact with each other. The surrounding cells are cells that are arranged to surround the pressed cells. However, the distance between the first conductive film 41 and the second conductive film 42 may be smaller than that in a state in which no pressing force is applied to the conductive sheet 40. Therefore, the first conductive film 41 and the second conductive film 42 corresponding to the surrounding cells may easily come into contact with each other, and may be easily identified as the pressed cells. The first conductive film 41 and the second conductive film 42 corresponding to the surrounding cells are in an unstable state, and there are cases in which the surrounding cells are identified as the pressed cells. As a result, there are cases in which the surrounding cells identified as the pressed cells are identified as the pressed cells pressed by the writing tool 12. Therefore, it is preferable to exclude the surrounding cells from targets for identifying the pressed cells pressed by the writing tool 12.

To address this, the CPU 21 invalidates the surrounding cells in the following manner. In a case where the pressed cells 94 shown in FIG. 14 are identified, the pressing force applied by an object other than the writing tool 12 is relatively large. The number of cells included in the pressed cells 94 is relatively large. In a case where the number of cells included in the pressed cells 94 is larger than a predetermined number, the CPU 21 identifies surrounding cells 95 that are arranged to surround the identified pressed cells 94. For example, the CPU 21 may identify adjacent cells, as surrounding cells, for each of the cells included in the pressed cells 94. Each of the adjacent cells is a cell that is identified by coordinates in which one of the X coordinate value and the Y coordinate value is different by one from that of the cell included in the pressed cells 94. Further, in this case, the CPU 21 may also identify, as adjacent cells, cells whose X coordinate value and Y coordinate value are respectively different, by one, from those of the cell included in the pressed cells 94. The CPU 21 invalidates, among the information stored in the first table 241, the position information of the cells surrounded by the identified surrounding cells 95. The CPU 21 stores the position information of the cells surrounded by the surrounding cells 95, in the previous cycle table (not shown in the drawings) of the flash memory 24.

The CPU 21 determines that one stroke of the writing operation is complete (step S19 (refer to FIG. 9)). In a case where the CPU 21 determines that one stroke of the writing operation is complete because of the fact that no pressed cell is detected (case (1) above), the CPU 21 invalidates the position information stored in the previous cycle table, among the position information included in writing data of one stroke stored in the flash memory 24. By this processing, the CPU 21 excludes the pressed cells corresponding to the position information stored in the previous cycle table from the targets for identifying the pressed cells pressed by the writing tool 12.

On the other hand, in a case where all the position information of the detected pressed cells is invalidated at step S39 (case (2) above) and thus the CPU 21 determines that one stroke of the writing operation is complete, the writing operation may be continuously performed. Therefore, at the same time at which the position information is retrospectively invalidated based on the previous cycle table, it is also necessary to invalidate the position information of a later stage of the continuing writing operation. To address this, the CPU 21 invalidates the position information included in the writing data in the following manner. First, the CPU 21 invalidates, among the position information included in the writing data, the position information of the cells surrounded by the surrounding cells 95, using the same method as in the above-described case (1). Further, the CPU 21 stores the information stored in the previous cycle table in the later cycle table (not shown in the drawings) of the flash memory 24.

In a case where the next stroke of the writing operation is complete, the CPU 21 then refers to the later cycle table. The position information of the cells surrounded by the surrounding cells 95 is included in the later cycle table. The CPU 21 invalidates, among the position information included in the writing data of one stroke, the position information of the cells surrounded by the surrounding cells 95. By doing this, the CPU 21 can invalidate the position information corresponding to two strokes of writing operations that are continuously performed. Further, the CPU 21 can effectively exclude the pressed cells that are pressed by an object other than the writing tool 12, and can exclude the pressed cells that are pressed by an object other than the writing tool 12 from the targets when identifying the pressed cells pressed by the writing tool 12.

Figure 15:
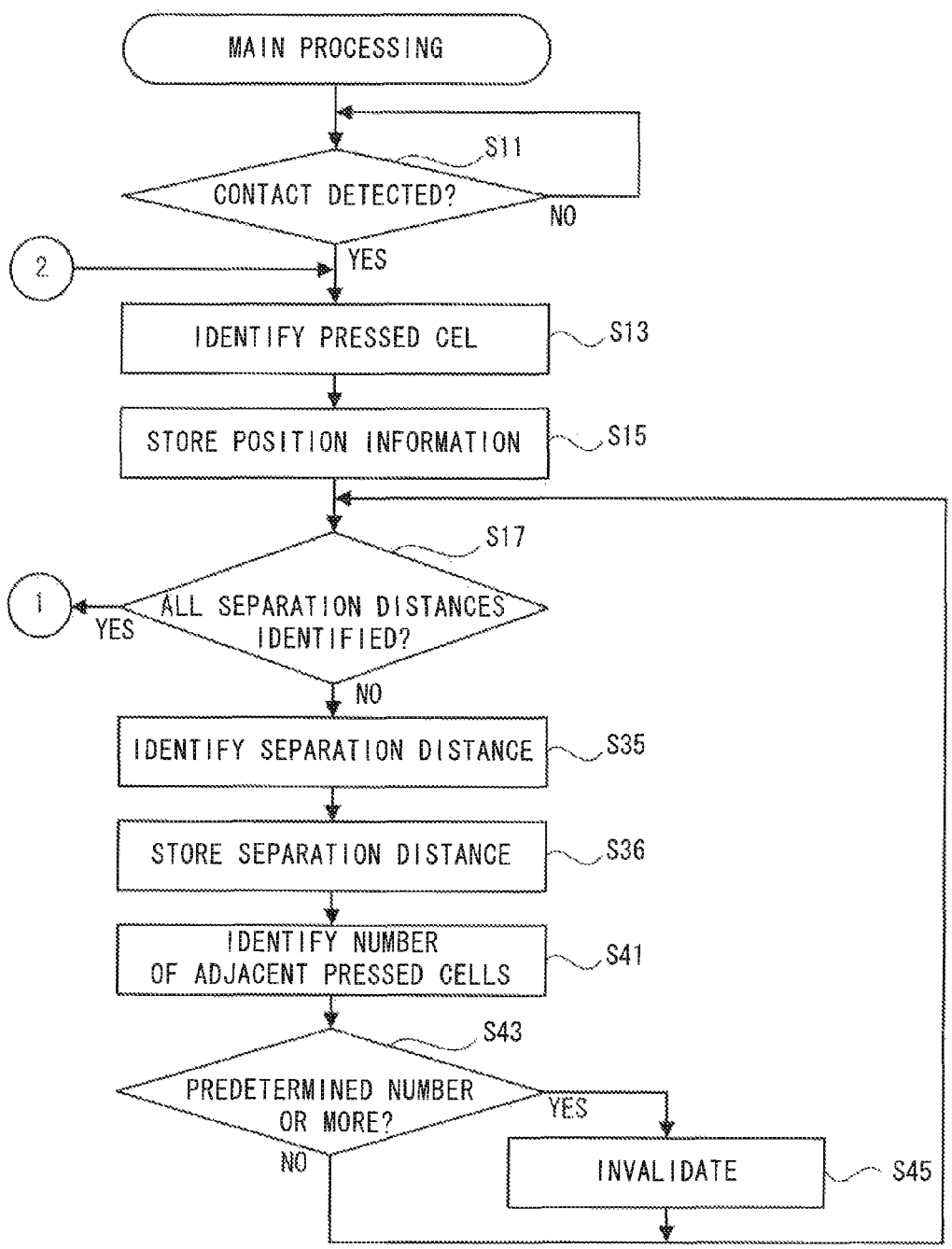
FIG. 15 is a flowchart showing main processing according to a modified example.
Figure 16:
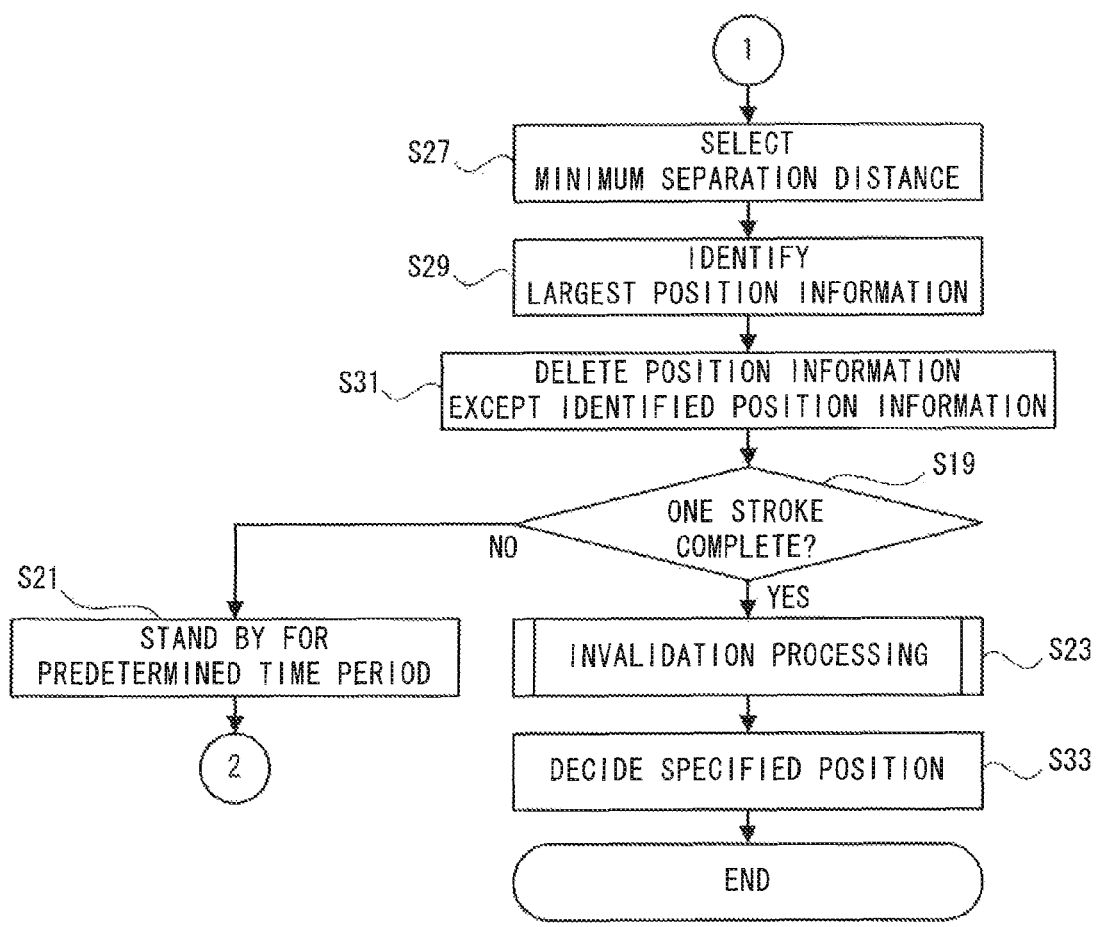
FIG. 16 is a flowchart showing the main processing according to the modified example, which is a continuation of FIG. 15.

Main processing according to a modified example that is performed by the CPU 21 will be explained with reference to FIG. 15 and FIG. 16. Processing steps that are the same as those of the above-described main processing (refer to FIG. 9) are denoted by the same reference numerals and an explanation thereof is omitted or simplified.

In a case where the CPU 21 detects contact between the resistive films 411 and 412 (yes at step S11), the CPU 21 identifies the pressed cell (step S13). The CPU 21 stores position information indicating a position of the identified pressed cell in the first table 241 (refer to FIG. 7 and FIG. 8) (step S15). The CPU 21 determines whether the separation distances between the pressed cell identified at step S13 and the other pressed cells indicated by the position information stored in the first table 241 have all been identified (step S17). In a case where there is the separation distance that has not been identified (no at step S17), the CPU 21 selects, from among combinations of the pressed cell identified at step S13 and the other pressed cells, a combination for which the separation distance has not been identified, and identifies the separation distance of the selected combination (step S35). The CPU 21 associates the identified separation distance with the position information of the pressed cells and stores the separation distance in the first table 241 (step S36).

The CPU 21 identifies, based on the position information stored in the first table 241, the number of cells that is the number of pressed cells that are arranged adjacent to each of the pair of pressed cells selected at step S35 (step S41). For example, the CPU 21 identifies, as adjacently arranged pressed cells, pressed cells that are indicated by the position information in which one of the X coordinate value and the Y coordinate value is different, by one, from the position information of the pressed cells. The CPU 21 determines whether the number of identified cells is equal to or more than a predetermined number (step S43). In a case where the identified number of cells is less than the predetermined number (no at step S43), the processing returns to step S17. On the other hand, in a case where the identified number of cells is equal to or more than the predetermined number (yes at step S43), the CPU 21 identifies cells (surrounding cells) that are arranged around the adjacently arranged pressed cells. In order to invalidate the position information of the cells surrounded by the identified surrounding cells, the CPU 21 associates flag information indicating that the position information is invalid with the position information of the corresponding pressed cells, and stores the flag information in the first table 241 (step S45). For example, in the processing at step S45, the CPU 21 identifies surrounding cell information. The surrounding cell information includes position information of all the cells surrounded by the surrounding cells. The CPU 21 determines whether, among the position information stored in the first table 241, there is the position information that matches any of the position information included in the surrounding cell information. In a case where there is the position information that matches any of the position information included in the surrounding cell information, the CPU 21 selects the position information that matches any of the position information included in the surrounding cell information. The CPU 21 associates the selected position information with the flag information indicating that the position information is invalid. By doing this, the flag information indicating that the position information is invalid is associated with the pressed cells surrounded by the surrounding cells. The processing returns to step S17. In a case where the separation distance is repeatedly identified and all the separation distances are identified (yes at step S17), the processing proceeds to step S27 (refer to FIG. 16). The processing from step S27 to step S31 is the same as the processing of the above-described embodiment and an explanation thereof is thus omitted here.

In a case where one stroke of the writing operation is complete (yes at step S19), the CPU 21 performs the invalidation processing (step S23). The invalidation processing will be explained in more detail with reference to a flowchart shown in FIG. 11. The CPU 21 acquires writing data of one stroke from the flash memory 24 (step S50). The CPU 21 determines whether it has been determined at step S19 (refer to FIG. 9) that one stroke of the writing operation is complete based on the reason of case (1), and whether the previous cycle table corresponding to the writing data of one stroke acquired at step S50 is stored in the flash memory 24 (step S51). In a case where the previous cycle table is stored in the flash memory 24 (yes at step S51), the CPU 21 invalidates, among the writing data acquired at step S50, the position information that is the same as the position information stored in the previous cycle table (step S55). The processing proceeds to step S59.

The CPU 21 determines whether it has been determined at step S19 (refer to FIG. 9) that one stroke of the writing operation is complete based on the reason of case (2), and whether a later cycle table corresponding to the stroke immediately preceding the stroke of the writing data acquired at step S50 is stored in the flash memory 24 (step S59). In a case where the later cycle table is stored in the flash memory 24 (yes at step S59), the CPU 21 invalidates, among the writing data acquired at step S50, the position information that is the same as the position information stored in the later cycle table (step S63). The invalidation processing ends and the processing returns to the main processing (refer to FIG. 9).

As explained above, the CPU 21 invalidates the position information of the cells surrounded by the surrounding cells. The CPU 21 can exclude the pressed cells that are in an unstable state due to a strong pressing force being applied thereto, from targets when identifying the pressed cells pressed by the writing tool 12. As a result of this, the CPU 21 can accurately recognize the pressed cells pressed by the writing tool 12.

In the above description, the CPU 21 identifies the surrounding cells when the number of adjacent pressed cells is equal to or more than a predetermined number. In contrast to this, the CPU 21 may be provided with, for example, a detection portion that directly detects pressure applied to the conductive sheet 40. The CPU 21 may identify the surrounding cells in a case where the detected pressure is equal to or more than a predetermined value.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A touch panel control device comprising:
a first identification portion that periodically identifies a plurality of pressed cells, the plurality of pressed cells being cells to which a pressing force is applied, among a plurality of cells arranged in a matrix manner on a panel surface of a touch panel;
a second identification portion that identifies at least one separation distance based on positions of a plurality of first pressed cells that are identified by the first identification portion at a first timing, the at least one separation distance indicating a distance between a plurality of pressed cells included in the plurality of first pressed cells;
a first invalidation portion that invalidates at least one pair of first cells among the plurality of first pressed cells identified at the first timing, the at least one pair of first cells being at least one pair of first pressed cells for which the separation distance identified by the second identification portion satisfies a predetermined condition;
a second invalidation portion that invalidates a second cell among a plurality of second pressed cells identified by the first identification portion at a second timing, the second timing being a timing preceding the first timing, and the second cell being a cell in the same position as one of the at least one pair of first cells;
the first identification portion at the first timing is based on the first identification portion at the second timing; and
a decision portion that decides, as a specified position, a position of at least one pressed cell from among a plurality of pressed cells included in at least one first valid pressed cell and at least one second valid pressed cell, the at least one first valid pressed cell being at least one pressed cell except the at least one pair of first cells invalidated by the first invalidation portion, among the plurality of first pressed cells identified at the first timing, and the at least one second valid pressed cell being at least one pressed cell except the second cell invalidated by the second invalidation portion, among the plurality of second pressed cells identified at the second timing.

2. The touch panel control device according to claim 1, further comprising:
a third invalidation portion that invalidates third cells among a plurality of third pressed cells identified at a third timing, the third timing being a timing later than the first timing, and the third cells being cells in the same positions as the at least one pair of first cells, wherein
the decision portion decides, as the specified position, a position of at least one pressed cell from among the at least one first valid pressed cell, the at least one second valid pressed cell and at least one third valid pressed cell, the at least one third valid pressed cell being at least one pressed cell except the third cells invalidated by the third invalidation portion, among the plurality of third pressed cells identified at the third timing.

3. A touch panel control device comprising:
a first identification portion that periodically identifies a plurality of pressed cells, the plurality of pressed cells being cells to which a pressing force is applied, among a plurality of cells arranged in a matrix manner on a panel surface of a touch panel;
a second identification portion that, based on positions of a plurality of first pressed cells that are identified by the first identification portion at a first timing, identifies the number of adjacent cells of each of the plurality of first pressed cells, the adjacent cells being arranged adjacent to one pressed cell included in the plurality of first pressed cells, and being other first pressed cells included in the plurality of first pressed cells;
a first invalidation portion that invalidates, among the plurality of first pressed cells, first cells that are arranged in surrounding cells, the surrounding cells being cells that surround the first pressed cells for which the number of the adjacent cells identified by the second identification portion satisfies a predetermined condition, among the plurality of first pressed cells identified by the first identification portion at the first timing;
a second invalidation portion that invalidates a second cell among a plurality of second pressed cells identified at a second timing, the second timing being a timing preceding the first timing, and the second cell being a cell in the same positions as one of the first cells;
the first identification portion at the first timing is based on the first identification portion at the second timing; and
a decision portion that decides, as a specified position that is a position on the panel surface, a position of at least one pressed cell from among at least one first valid pressed cell and at least one second valid pressed cell, the at least one first valid pressed cell being at least one pressed cell except the first cells invalidated by the first invalidation portion, among the plurality of first pressed cells identified at the first timing, and the at least one second valid pressed cell being at least one pressed cell except the second cell invalidated by the second invalidation portion, among the plurality of second pressed cells identified at the second timing.

4. The touch panel control device according to claim 3, further comprising:
a third invalidation portion that invalidates third cells among a plurality of third pressed cells identified at a third timing, the third timing being a timing later than the first timing, and the third cells being cells in the same positions as the first cells, wherein
the decision portion decides, as the specified position, a position of at least one pressed cell from among the at least one first valid pressed cell, the at least one second valid pressed cell and at least one third valid pressed cell, the at least one third valid pressed cell being at least one pressed cell except the third cells invalidated by the third invalidation portion, among the plurality of third pressed cells identified at the third timing.

5. A non-transitory computer-readable medium storing computer-readable instructions that instruct a touch panel control device to perform the steps of:
periodically identifying a plurality of pressed cells, the plurality of pressed cells being cells to which a pressing force is applied, among a plurality of cells arranged in a matrix manner on a panel surface of a touch panel;
identifying at least one separation distance based on positions of a plurality of first pressed cells identified at a first timing, the at least one separation distance indicating a distance between a plurality of pressed cells included in the plurality of first pressed cells;

invalidating at least one pair of first cells among the plurality of first pressed cells identified at the first timing, the at least one pair of first cells being at least one pair of first pressed cells for which the identified separation distance satisfies a predetermined condition;

invalidating a second cell among a plurality of second pressed cells identified at a second timing, the second timing being a timing preceding the first timing, and the second cell being a cell in the same positions as one of the at least one pair of first cells;

a plurality of first pressed cells identified at a first timing are based on a plurality of second pressed cells identified at a second timing; and deciding, as a specified position, a position of at least one pressed cell from among a plurality of pressed cells included in at least one first valid pressed cell and at least one second valid pressed cell, the at least one first valid pressed cell being at least one pressed cell except the invalidated at least one pair of first cells, among the plurality of first pressed cells identified at the first timing, and the at least one second valid pressed cell being at least one pressed cell except the invalidated second cell, among the plurality of second pressed cells identified at the second timing.

6. The non-transitory computer-readable medium according to claim 5, wherein the non-transitory computer-readable instructions further instruct the touch panel control device to perform the steps of:

invalidating third cells among a plurality of third pressed cells identified at a third timing, the third timing being a timing later than the first timing, and the third cells being cells in the same positions as the at least one pair of first cells, wherein the deciding includes deciding, as the specified position, a position of at least one pressed cell from among the at least one first valid pressed cell, the at least one second valid pressed cell and at least one third valid pressed cell, the at least one third valid pressed cell being at least one pressed cell except the invalidated third cells, among the plurality of third pressed cells identified at the third timing.

* * * * *